(12) United States Patent
Abdesselem et al.

(10) Patent No.: US 6,728,537 B1
(45) Date of Patent: Apr. 27, 2004

(54) GPRS MOBILE PAGING METHOD

(75) Inventors: Ouelid Abdesselem, Toulouse (FR); Lionel Frederic Ulmer, Toulouse (FR); Francois Deparis, Plaisance (FR)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/481,114

(22) Filed: Jan. 11, 2000

(30) Foreign Application Priority Data

Jan. 11, 1999 (EP) .............................................. 99400053

(51) Int. Cl.[7] .............................. H04Q 7/20; H04M 1/08
(52) U.S. Cl. ..................... 455/434; 455/574; 370/347; 370/442
(58) Field of Search ................................. 455/434, 422, 455/455, 13.4, 511, 127.6, 574, 450; 370/452.1, 347, 442, 444, 468

(56) References Cited

U.S. PATENT DOCUMENTS

| | | | |
|---|---|---|---|
| 5,663,954 A | * 9/1997 | Hakkanen et al. | 370/278 |
| 5,729,541 A | * 3/1998 | Hamalainen et al. | 370/337 |
| 5,974,032 A | * 10/1999 | Snowden et al. | 370/316 |
| 6,385,456 B2 | * 5/2002 | Menzel | 455/452.2 |
| 6,600,731 B2 | * 7/2003 | Menzel et al. | 370/347 |

FOREIGN PATENT DOCUMENTS

| | | |
|---|---|---|
| JP | 406315034 A * | 11/1994 |
| WO | WO 98/38818 | 9/1998 |

OTHER PUBLICATIONS

ETSI TC–SMG: "Digital Cellular Telecommunications System (Phase 2+); Multiplexing and Multiple Access on the Radio Path", (GSM 05.02 Version 5.7.1 Release 1996.

* cited by examiner

*Primary Examiner*—Sinh Tran
*Assistant Examiner*—Sheila Smith
(74) *Attorney, Agent, or Firm*—Rolland R. Hackbart; Randall S. Vaas

(57) ABSTRACT

The invention concerns a method of scheduling the time of transmission of one or more GPRS paging blocks in a cell of a cellular communications system, the paging blocks initiating communication to a mobile terminal in a cellular communications system, comprising calculating the transmission time of the paging block, or the transmission times of the paging blocks, in dependence on:

(i) the number N determining which control channel carries the paging blocks of a given terminal;
(ii) the number M of GPRS paging blocks on the control channel;
(iii) the number KC of control channels in the cell of the cellular communications system; and
(iv) the International Mobile Subscriber Identity (IMSI) number of the mobile terminal.

The scheduling of the time of transmission of the one or more GPRS paging blocks in the cell of the cellular communications system may even out the distribution over time of the transmissions.

10 Claims, 1 Drawing Sheet

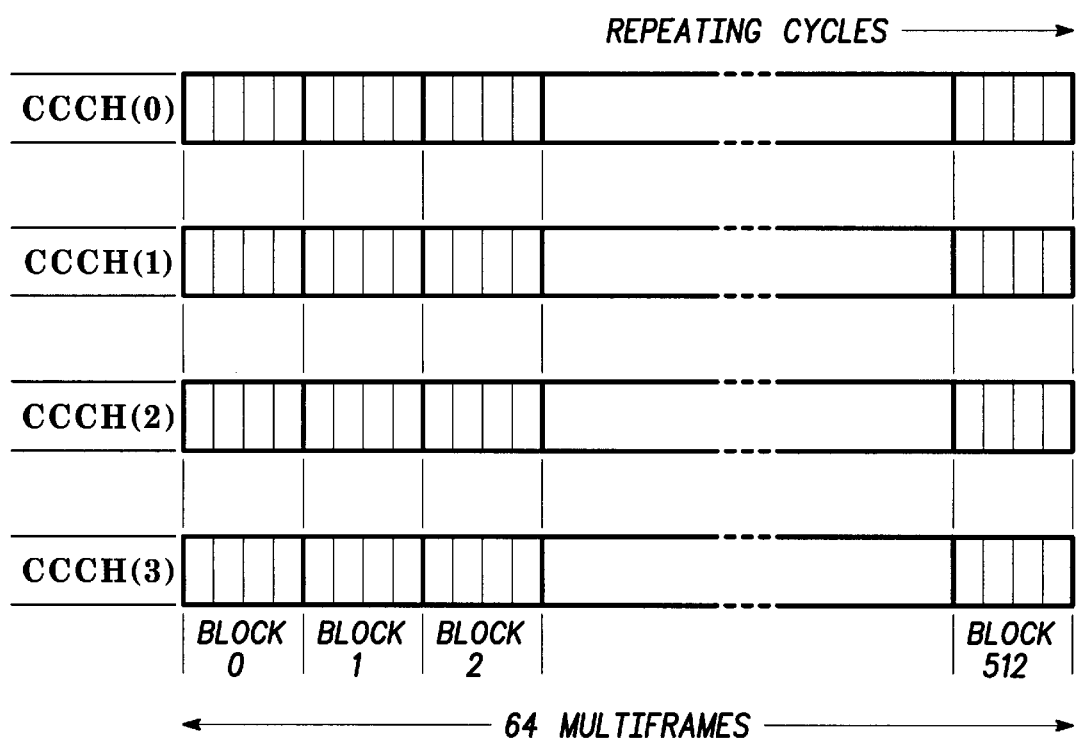

GPRS MOBILE PAGING METHOD

TECHNICAL FIELD

The invention relates to a cellular communications system comprising mobile communication units.

BACKGROUND

Communication systems are known in which the users of the system have mobile terminals. These terminals can communicate with each other through the infrastructure of a 'mobile network'. This network includes base stations, which are central radio transmitter- and receiver units. The base stations are linked to one another by the network. A terminal can also communicate through the mobile network to a traditional fixed line telephone network. A packet radio system may work in this way.

A terminal establishes a communication link to a base station via a radio signal, and communicates over this link. A terminal normally communicates over a radio link set up to the base station which provides the strongest signal, this usually being the base station which is nearest to the mobile terminal at that point in time.

Typically a communication pathway within the system outlined above consists of a first bi-directional radio link between a first mobile terminal and a nearby first base-station. From the first base station the communication link may typically further connect through a fixed line system to another, second base station. The second base station will communicate over a second bi-directional radio link with a second mobile terminal. Thus two-way communication between the mobile terminals is possible.

Communication systems such as that outlined above operate in accordance with internationally agreed standards. A recent standard for such systems is the European Telecommunications Standards Institute's (ETSI) GSM standard number 05.02. Version 6.3.0 of this standard has recently been made available. This standard relates to communication networks and mobile terminals which may communicate using either circuit switched (CS) communication links and/or group switched packet (GPRS) communication links.

A communication in accordance with ETSI standard GSM 05.02 permits the exchange of voice communication and/or data between mobile terminals. Furthermore, this communication system allows mobile terminals of varying sophistication to operate within it, and also foresees the mobile network being able to operate in up to three different modes. These network modes are referred to as 'Network mode 1', 'Network mode 2' and 'Network mode 3' respectively.

The three 'network modes' in which the network can operate have some similarities, but differ in several aspects. For the purposes of the invention, it is important to consider how a base station sets up a communication link with a mobile terminal in each of the three different modes.

In all three network modes, a communication link initiated by the mobile network is set up by the base station broadcasting a signal which the mobile terminal receives. The signal used to set up a communication link is referred to as a 'paging' signal. When a mobile terminal receives and recognises a paging signal destined for it, the mobile terminal knows that it is to set up a communication link with the base station. For the mobile terminal to receive a paging signal, the terminal must know in advance when to turn on its radio receiver to 'listen' for a paging signal destined for that terminal. The mobile terminal is said to be in 'idle mode' when it is waiting to be paged by the network.

The mobile terminals used in a communication system built in accordance with the standard GSM 05.02 may have one of three levels of capability. These are as follows:

(i) Class A Mobile Terminals

A Class A terminal is capable of communicating with a base station of the mobile network using both circuit switched and GPRS links simultaneously. This means that the user of the class A terminal can, for example, speak to another user over a circuit switched communication link and simultaneously transmit a data file over a GPRS link.

(ii) Class B Mobile Terminals

A Class B terminal is only capable of communicating with a base station either by a circuit switched link or by a GPRS link at any one time. This means that the user of the class B terminal cannot speak to another user over a circuit switched communication link and simultaneously transmit a data file over a GPRS link.

When a class B terminal is in idle mode, the network can page the mobile terminal for either circuit switched or GPRS communication.

(iii) Class C Mobile Terminals

A Class C terminal is only capable of communicating with a base station by a GPRS link.

A further type of mobile terminal may also be present in the communication system. These are mobile terminals which can only receive CCCH channels, and which have no capability of receiving GPRS signals.

Next, it is important to understand how the network transmits a paging signal to a mobile terminal in accordance with ETSI GSM standard 05.02.

The mobile network can page a mobile terminal on one of two types of channel. The base stations of the mobile network may broadcast a signal on a control channel referred to as the Common Control Channel or 'CCCH' channel. A CCCH channel is the standard control channel used in prior art GSM networks to set up a communication link between the base station and a mobile terminal. However, the base stations may broadcast a signal on a control channel referred to as the Packet Common Control Channel or 'PCCCH' channel. The PCCCH channel is a physical channel which has been newly created for GPRS networks. The PCCCH channel can serve many purposes, of which paging of GPRS terminals is just one. Notably, it is not mandatory for a GPRS cell to have PCCCH channels. If a cell does not have PCCCH channels, then the base station in the cell pages a GPRS terminal on the 'CCCH' channel FIG. 1 illustrates four CCCH channels in accordance with the GSM 05.02 standard. These channels are labelled CCCH (0)–CCCH(3).

The definition of a physical channel in GSM is that it comprises a frequency, which may change value or 'hop', and a time slot. Each of the four channels shown in FIG. 1 therefore represents a sequence of transmitted signals which may in reality be transmitted at different frequencies.

The number of circuit switched paging blocks available on each control channel (CCCH) is defined as N. In FIG. 1, N=512.

The CCCH signal is made up of a number of multiframes. In the arrangement of FIG. 1, this is 64. Each multiframe contains eight paging blocks, making the total of N=512 blocks.

Each block in FIG. 1 is shown to comprise 4 time-slots. The signals in the four time slots in any one block together make up the circuit switched paging block. Although shown consecutively in FIG. 1, the four time slots of a paging block are in reality likely to be broadcast in four identically numbered time slots in four consecutive groups of eight time slots. In each such group of eight time slots, the other seven time slots in the group do not relate to this paging block. Each of these groups of eight time slots is in fact a frame.

The use of the control channels according to the prior art arrangement of GSM 05.02 standard now needs to be considered. In accordance with this prior art arrangement, the mobile terminals in a cell are assigned paging blocks consecutively. The first 512 mobile stations can each be assigned a paging block on channel CCCH(0), because it can contain 512 blocks. See FIG. 1. If there are, for example, 1000 mobile terminals, then 512 terminals will be assigned paging blocks in channel CCCH(0), a further 488 terminals will be assigned paging blocks in channel CCCH(1), and the channels CCCH(2) and CCCH(3) will not transmit paging signals to any mobile terminals, so will remain unused.

In practice, both the network and a particular mobile terminal are able to calculate the individual paging block which the base station will use to make contact with that particular mobile terminal. Thus the mobile terminal will be able to monitor for a paging signal at the correct time point to receive any paging signal broadcast to it.

In the GSM system, there are four CCCH channels which are all broadcast on one frequency. This frequency changes from time to time, in other words it 'hops'. There may be several PCCCH channels in a cell. The PCCCH channels are each broadcast on a different frequency.

The three Network modes specified in the GSM 05.02 standard are as follows:

'Network Mode 1'

In this mode, the paging of mobile terminals is coordinated by the network. All circuit switched paging for class B terminals is re-routed by the network into blocks which are reserved for GPRS paging blocks on the PCCCH channel.

When the network is operating in network mode 1, any class B mobile terminal only needs to monitor the GPRS paging block positions in order to detect any paging signal destined for that terminal.

If a particular cell of the communication system has a base station which can broadcast a PCCCH channel, then the base station broadcasts all the circuit switched and GPRS the paging blocks on the PCCCH channel when the network is in network mode 1.

(ii) 'Network Mode 2'

In this mode, the cell does not broadcast a PCCCH channel. There is no co-ordination of paging signals at the network level.

The operation of a mobile terminal when the network is in network mode 2 can take one of several forms.

The mobile terminal may support a mode of operation called 'SPLIT_PG_CYCLE'. 'SPLIT_PG_CYCLE' is a GPRS parameter which is used to know the position of the paging signals within the signal broadcast from the base station. If the mobile terminal supports SPLIT_PG_CYCLE then, when in idle mode, a class B mobile terminal has to monitor for CS paging signals and for GPRS paging signals in two different positions on the CCCH channel. This monitoring on different positions has implications for the battery life of the mobile terminal, since the terminal needs to actively monitor for paging signals for a greater proportion of the time.

However, a mobile terminal may degrade to a state where it does not support SPLIT_PG_CYCLE. The mobile enters this state when the network is not broadcasting the PCCCH channel. In this state, the terminal monitors for CS and GPRS paging signals on CS positions.

(iii) 'Network Mode 3'

In network mode 3, there are usually 2 channels, one CCCH and one PCCCH. However, there is no co-ordination at the network level. A class B terminal has to monitor for both CS paging on the CCCH channel and for GPRS paging on the PCCCH channel. Thus once again in this case, the mobile must spend a greater proportion of the time monitoring for a paging signal than would be the case when the network is operating in network mode 1.

When the network is operating in network mode 3, some cells may in fact operate without using PCCCH channels. A terminal does not therefore know what channels a cell can provide when the terminal enters the cell.

Finally, it is important to consider how a particular mobile terminal monitors for paging signals when it is in idle mode.

A GPRS terminal in idle mode only monitors one PCCCH channel. The terminal calculates which channel this is based on its own International Mobile Subscriber Identity (IMSI) number. This calculation in fact allows the mobile terminal to select one PCCCH channel, referred to as that mobile terminal's 'PCCCH_GROUP', from the list of PCCCH channels. The PCCCH_GROUP is simply an index in the list of PCCCH channels.

Consider now that the GPRS mobile terminal knows which PCCCH channel to monitor for paging signals. The mobile terminal is further able to calculate the time or times at which it needs to monitor for paging signals on this PCCCH channel. The mobile terminal does this by calculating a variable termed the 'PAGING_GROUP'. The PAGING_GROUP comprises the set of paging blocks, within the repeating cycle of 64 multiframes in GPRS, on which the network may broadcast a paging signal to the mobile terminal in question. There may just be one paging block in the PAGING_GROUP. However, in GPRS the mobile terminal may be paged on more than one of the paging blocks within the 64 multiframes, and in such a case the PAGING_GROUP identifies each of these blocks. A particular mobile terminal needs to monitor the PCCCH signal broadcast by the network at the times at which the base station broadcasts the paging blocks indicated in the PAGING_GROUP. This monitoring activity determines the amount of power which the mobile terminal's receiver circuitry consumes, and hence influences heavily the power consumption of the mobile terminal and its battery life.

Any reduction in the amount of monitoring activity which a mobile terminal must carry out is highly desirable, since this will increase the battery life of the mobile terminal.

Analogously to the variables PCCCH_GROUP and PAGING_GROUP explained above, the variables CCCH_GROUP and PAGING_GROUP are defined for circuit switched mobile terminals.

BRIEF DESCRIPTION OF THE DRAWINGS

FIG. 1 shows the structure of four CCCH channels broadcast in accordance with ETSI's GSM standard 05.02.

DETAILED DESCRIPTION OF THE PREFERRED EMBODIMENT

The invention comprises a method of scheduling the times of transmission of the GPRS paging blocks in a cell of the communications system. The method of the invention builds on the method of the ETSI standard GSM 05.02. The method of the invention includes the variable N in the calculation of the transmission times of the GPRS paging blocks. The variable N is a parameter of the circuit switching blocks broadcast on the CCCH channel. One definition of N is given below.

N is the number of different CS paging blocks in a CCCH channel. More generally, N is defined in section 6.5.2 of ETSI GSM standard 05.02 v 6.3.0. Where used, M is the number of different GPRS paging blocks in a CCCH channel.

Incorporation of N in the calculation of the times of transmission of the GPRS paging blocks provides a much more even distribution over time of the mobile terminals over the available transmission blocks.

In the inventive method of scheduling the time of transmission of one or more GPRS paging blocks in a cell of a cellular communications system, the paging blocks initiate communication to a mobile terminal in the cellular communications system. The method comprises calculating the transmission time of the paging block, or the transmissions times of paging blocks, in dependence on:

(i) the number N determining which control channel carries the paging blocks of a given terminal;
 (ii) the number M of GPRS paging blocks on the control channel;
 (iii) the number KC of control channels in the cell of the cellular communications system; and
 (iv) the International Mobile Subscriber Identity (IMSI) number of the mobile terminal.

The method has the advantage of evening out the scheduling of the time of transmission of the GPRS paging blocks in the cell of the cellular communications system.

The control channel carrying the paging blocks of a terminal is chosen from a list of control channels. The terminal is identified by its IMSI number. On the list of control channels there are a total number KC of control channels. The index PCCCH_GROUP identifies the actual control channel, and the index PCCCH_GROUP may be calculated using the formula:

$$PCCCH\_GROUP = (IMSI \bmod 1000) \bmod (KC*N) \mathrm{div} N$$

whereby the time of transmission of the first GPRS paging block is calculated using the formula:

$$PAGING\_GROUP(0) = (((IMSI \bmod 1000) \mathrm{div}(KC*N))*N + (IMSI \bmod 1000) \bmod (N)) \bmod M$$

Having calculated PAGING_GROUP(0) as above, the time of transmission of subsequent GPRS paging blocks may then be calculated using the formula:

$$PAGING\_GROUP(m) = (PAGING\_GROUP(0) + \mathrm{funct}(SPLIT\_PG\_CYCLE, m)) \bmod M \text{ with } m=0, \ldots \mathrm{Min}(M, SPLIT\_PG\_CYCLE)-1,$$

where m is the sequence number of the paging block subsequent to paging block 0; and funct (SPLIT_PG_CYCLE,m) is a variable defined in the ETSI GSM standard 05.02 version 6.3.0.

In the calculations above N may take the value of 1. The cellular communications system may be a GPRS communication system operating in network mode 2.

The method above is particularly advantageous for network mode 2 operation of a GPRS capable network.

In another aspect of the invention, the inventor has further devised a method of enhancing the functionality of class B mobile terminals.

Consider class B mobile terminals operating in a cell which is operating under network mode 3. The mobile terminal must listen for both circuit switched and GPRS transmissions on a CCCH and a PCCCH channel.

However, the slots on the CCCH channel and the PCCCH channel may actually be transmitted for the same mobile within a very short time of one another. If the mobile needs a number of time slots to re-tune between the CCCH channel and the PCCCH channel, it may not have enough time to do this. The mobile terminal will then miss either a time slot on the CCCH channel or one on the PCCCH channel.

The method of the invention limits the PCCCH channels which can be used by the cell in comparison with the PCCCH channels on the list according to the ETSI GSM standard 05.02. In particular, the communication system may delete from the list of possible PCCCH channels any channels which are broadcast on time slots less than a certain minimum separation in time from the time slots used to broadcast a signal on the CCCH channel to the particular mobile terminal.

This aspect of the invention therefore relates to a method of scheduling the times of transmission of GPRS paging blocks on the Packet Common Control Channels (PCCCH) in a cell of a cellular communications system, the paging blocks initiating communication to a mobile terminal in the cellular communications system. The method comprises in sequence:

(i) broadcasting a list of potential PCCCH channels to the mobile terminals in the cell;
 (ii) determining the Common Control Channel (CCCH) at least one mobile terminal;
 (iii) for the mobile terminal, removing from the broadcast list of potential PCCCH channels any PCCCH channels with transmission time-slots separated by less than a certain minimum time t from the nearest time-slot for broadcasting a signal on the CCCH channel to the mobile terminal;
 (iv) selecting the PCCCH channel of the mobile terminal from the reduced list of PCCCH channels.

The method may use criteria for removing a PCCCH channel from the broadcast list which depend also on the multislot class capability of the mobile terminal list.

The cellular communications system may be a GPRS cellular network operating in network mode 3. The mobile terminal may be a class B GPRS mobile terminal.

We claim:

1. A method of scheduling the time of transmission of one or more GPRS paging blocks in a cell of a cellular communications system, said paging blocks initiating communication to a mobile terminal in a cellular communications system, comprising calculating a transmission time of a paging block, or transmission times of said paging blocks, in dependence on:

(i) a number N determining which control channel carries said paging block(s) of a given terminal;
 (ii) a number M of GPRS paging block(s) on said control channel;
 (iii) a number KC of control channels in said cell of said cellular communications system; and
 (iv) an International Mobile Subscriber Identity (IMST) number of said mobile terminal, whereby said control channel carrying said paging block(s) of a terminal identified by its IMSI number is chosen from a list of control channels, there being a total number KC of control channels on said list of control channels, by an index PCCCH GROUP, said index PCCCH GROUP being calculated using a formula:

$$PCCCH\_GROUP = (IMSI \bmod 1000) \bmod (KC*N) \operatorname{div} N$$

and whereby said time of transmission of a first GPRS paging block is calculated using said formula:

$$PAGING\_GROUP(0) = (((IMSI \bmod 1000) \operatorname{div}(KC*N))*N + (IMSI \bmod 1000) \bmod (N)) \bmod M.$$

2. The method of claim 1, whereby scheduling of the time of transmission of one or more GPRS paging blocks in said cell of said cellular communications system evens out the distribution over time of said transmissions.

3. The method of claim 1, whereby said time of transmission of subsequent GPRS paging blocks is calculated using a formula:

$$PAGING\_GROUP(m) = (PAGING\_GROUP(0) + \operatorname{funct}(SPLIT\_PG\_CYCLE, m)) \bmod M \text{ with } m=0, \ldots \operatorname{Min}(M, SPLIT\_PG\_CYCLE-1,$$

where m is the sequence number of the paging block subsequent to paging block 0;

and funct (SPLITS_PG_CYCLE,m) is a variable defined in the ETSI GSM standard 05.02 version 6.3.0.

4. The method of claim 1, where N=1.

5. The method of claim 1, where the cellular communications system is a GPRS communication system operating in network mode 2.

6. A method, in a communication device, of determining the timing of one or more GPRS paging blocks on a control channel of a cellular communications system, whereby the control channel is chosen from a list of control channels using an index PCCCH_GROUP, the index PCCCH_GROUP being calculated using the formula:

$$PCCCH\_GROUP = (IMSI \bmod 1000) \bmod (KC*N) \operatorname{div} N;$$

where:

IMSI is an International Mobile Subscriber Identity (IMSI) number;

KC is the number of control channels on the list of control channels; and

N is an integer greater or equal to one;

and whereby the Lime of transmission of the first GPRS paging block is calculated using the formula:

$$PAGING\_GROUP(0) = (((IMSI \bmod 1000) \operatorname{div}(KC*N))*N + (IMSI \bmod 1000) \bmod (N)) \bmod M$$

wherein M is the number of GPRS paging blocks available on the control channel.

7. The method of claim 6, whereby the time of transmission of subsequent GPRS paging blocks is calculated using the formula:

$$PAGING\_GROUP(m) = (PAGING\_GROUP(0) + \operatorname{funct}(SPLIT\_PG\_CYCLE, m)) \bmod M \text{ with } m=0, \ldots \operatorname{Min}(M, SPLIT\_PG\_CYCLE)-1,$$

where m is the sequence number of the paging block subsequent to paging block 0;

and funct (SPLIT_PG_CYCLE,m) is a variable defined in the ETSI GSM standard 05.02 version 6.3.0.

8. The method of claim 6 wherein N=1.

9. The method of claim 6, wherein N is the number of paging blocks available on a control channel.

10. The method of claim 6, where the cellular communications system is a GPRS communication system operating in network mode 2.

* * * * *

UNITED STATES PATENT AND TRADEMARK OFFICE
CERTIFICATE OF CORRECTION

PATENT NO.    : 6,728,537 B1
DATED         : April 27, 2004
INVENTOR(S)   : Abdesselem, Ouelid et al.

It is certified that error appears in the above-identified patent and that said Letters Patent is hereby corrected as shown below:

Column 7,
Line 29, change "(SPLITS" to -- SPLIT --

Column 8,
Line 11, change "Lime" to -- time --

Signed and Sealed this

Sixth Day of July, 2004

JON W. DUDAS
*Acting Director of the United States Patent and Trademark Office*